(12) United States Patent
Yaguchi

(10) Patent No.: US 7,906,863 B2
(45) Date of Patent: Mar. 15, 2011

(54) POWER OUTPUT APPARATUS, VEHICLE EQUIPPED WITH POWER OUTPUT APPARATUS, AND CONTROL METHOD OF POWER OUTPUT APPARATUS

(75) Inventor: Hideaki Yaguchi, Toyota (JP)

(73) Assignee: Toyota Jidosha Kabshiki Kaisha, Toyota-shi (JP)

( * ) Notice: Subject to any disclaimer, the term of this patent is extended or adjusted under 35 U.S.C. 154(b) by 1071 days.

(21) Appl. No.: 11/630,373

(22) PCT Filed: Apr. 22, 2005

(86) PCT No.: PCT/JP2005/008261
§ 371 (c)(1),
(2), (4) Date: Dec. 22, 2006

(87) PCT Pub. No.: WO2006/006293
PCT Pub. Date: Jan. 19, 2006

(65) Prior Publication Data
US 2008/0018111 A1 Jan. 24, 2008

(30) Foreign Application Priority Data
Jul. 12, 2004 (JP) ................................. 2004-204709

(51) Int. Cl.
*F02B 63/04* (2006.01)
(52) U.S. Cl. .................................... 290/40 B; 290/40 C
(58) Field of Classification Search ................ 290/40 B, 290/40 C, 40 R; 180/65.51, 65.24, 65.26, 180/65.21
See application file for complete search history.

(56) References Cited

U.S. PATENT DOCUMENTS

| | | | | |
|---|---|---|---|---|
| 5,784,879 A | * | 7/1998 | Dohta et al. | 60/276 |
| 6,213,234 B1 | * | 4/2001 | Rosen et al. | 180/65.245 |
| 6,230,683 B1 | * | 5/2001 | zur Loye et al. | 123/435 |
| 6,570,265 B1 | * | 5/2003 | Shiraishi et al. | 290/40 C |
| 6,920,948 B2 | * | 7/2005 | Sugiura et al. | 180/65.28 |
| 2001/0034571 A1 | | 10/2001 | Yoshino et al. | |

FOREIGN PATENT DOCUMENTS

JP 10-150702 A 6/1998
(Continued)

*Primary Examiner* — J Gon
*Assistant Examiner* — Iraj A Mohandesi
(74) *Attorney, Agent, or Firm* — Kenyon & Kenyon LLP

(57) ABSTRACT

In a hybrid vehicle of the invention, a hybrid electronic control unit sets a drive point of an engine and torque commands Tm1* and Tm2* of motors MG1 and MG2 in a range of an input limit and an output limit of a battery, in order to satisfy a preset power demand, and sends the engine drive point to an engine ECU and the torque commands Tm1* and Tm2* simultaneously with the input limit and the output limit of the battery to a motor ECU. The motor ECU verifies whether the operations of the motors MG1 and MG2 with the torque commands Tm1* and Tm2* are in the range of the input limit and the output limit of the battery. When the operations of the motors MG1 and MG2 are out of the range of the input limit and the output limit, the motor ECU resets the torque commands Tm1* and Tm2* to make the operations of the motors MG1 and MG2 in the range of the input limit and the output limit and controls the operations of the motors MG1 and MG2 with the reset torque commands Tm1* and Tm2*. This arrangement effectively prevents the battery from being overcharged with excessive electric power or from being overdischarged to supply excessive electric power even in the state of electric power imbalance due to a communication lag.

13 Claims, 8 Drawing Sheets

FOREIGN PATENT DOCUMENTS

| | | | |
|---|---|---|---|
| JP | 2001-263120 A | 9/2001 |
| JP | 2001-268712 A | 9/2001 |
| JP | 2001-282302 A | 10/2001 |
| JP | 2001-320806 A | 11/2001 |
| JP | 2002-034171 A | 1/2002 |

* cited by examiner

POWER OUTPUT APPARATUS, VEHICLE EQUIPPED WITH POWER OUTPUT APPARATUS, AND CONTROL METHOD OF POWER OUTPUT APPARATUS

This is a 371 national phase application of PCT/JP2005/008261 filed 22 Apr. 2005, claiming priority to Japanese Patent Application No. 2004-204709 filed 12 Jul. 2004, the contents of which are incorporated herein by reference.

TECHNICAL FIELD

The present invention relates to a power output apparatus, a vehicle equipped with the power output apparatus, a control method of the power output apparatus, and a control program for the power output apparatus. More specifically the invention pertains to a power output apparatus that outputs power, a vehicle equipped with the power output apparatus as a driving source, a control method of the power output apparatus, and a control program used for controlling the power output apparatus.

BACKGROUND ART

One proposed vehicle equipped with a power output apparatus includes a master CPU for performing arithmetic operations and a motor CPU for driving a motor (see, for example, Japanese Patent Laid-Open Gazette No. 2001-320806). In this prior art vehicle, the master CPU computes a drive point of an engine and torque commands of two motors and sends the engine drive point to an engine electronic control unit and the torque commands of the motors to a motor control unit. The motor CPU of the motor control unit drives and controls driving circuits of, for example, inverters, in response to the received motor torque commands to control the operations of the two motors.

DISCLOSURE OF THE INVENTION

In the control system including multiple CPUs for role-sharing control of multiple driving devices, a time delay by communication (communication lag) is to be taken into account for the adequate control of the driving devices. The motor can change its driving condition in a short time period. Due to the communication lag, the motor or another driving device of the similar tendency may shift to a different driving condition from the expected driving condition for the control. This may lead to a deviation from the expected electric power balance. The operation of the motor may be controlled to keep the electric power balance in the vicinity of boundaries in a range of an input limit and an output limit of an accumulator unit, such as a secondary battery. In such cases, the deviation from the expected electric power balance may cause the operation of the motor to be beyond the range of the input limit and the output limit of the accumulator unit.

The power output apparatus of the invention, the vehicle equipped with the power output apparatus, the control method of the power output apparatus, and the control program for the power output apparatus are applied to a control system including multiple CPUs for role-sharing control and aim to control operation of a motor in a range of an input limit and an output limit of an accumulator unit, such as a secondary battery, even in the state of electric power imbalance due to a communication lag. The power output apparatus of the invention, the vehicle equipped with the power output apparatus, the control method of the power output apparatus, and the control program for the power output apparatus also aim to prevent the accumulator unit, such as the secondary battery, from being overcharged with excessive electric power or being over-discharged to supply excessive electric power.

In order to attain at least part of the above and the other related objects, the power output apparatus of the invention, the vehicle equipped with the power output apparatus, the control method of the power output apparatus, and the control program for the power output apparatus have the configurations discussed below.

The first power output apparatus of the invention is directed to a power output apparatus that outputs power, the power output apparatus includes: a power generation system that receives a supply of fuel to generate electric power; a motor that outputs a driving power; an accumulator unit that transmits electric power to and from the power generation system and the motor; a power demand setting module that sets a power demand required for driving; a main control module that makes operation commands of the power generation system and the motor in a range of an input limit and an output limit of the accumulator unit, in order to satisfy the set power demand; and a drive control module that controls operations of the power generation system and the motor in the range of the input limit and the output limit of the accumulator unit, in response to the operation commands input from the main control module.

In the first power output apparatus of the invention, the main control module makes the operation commands of the power generation system and the motor in the range of the input limit and the output limit of the accumulator unit, in order to satisfy the set power demand. The drive control module controls the operations of the power generation system and the motor in the range of the input limit and the output limit of the accumulator unit, in response to the operation commands input from the main control module. There may be a time difference between the timing of making the operation commands by the main control module and the timing of controlling the operations of the power generation system and the motor by the drive control module, due to, for example, a communication lag. Even in such cases, the first power output apparatus of the invention causes the drive control module to control the operations of the power generation system and the motor in the range of the input limit and the output limit of the accumulator unit. This arrangement effectively prevents the accumulator unit from being overcharged with excessive electric power or being over-discharged to supply excessive electric power.

In one preferable embodiment of the invention, the first power output apparatus may further includes an input/output limits setting module that sets the input limit and the output limit of the accumulator unit, based on a state of the accumulator unit, wherein the main control module makes the operation commands of the power generation system and the motor by taking into account the input and output limits of the accumulator unit set by the input/output limits setting module, and sends the operation commands and the input and output limits to the drive control module. There may be a time delay due to, for example, the communication lag, with regard to the input limit and the output limit of the accumulator unit. The changes of the input limit and the output limit of the accumulator unit are, however, negligible in the time delay by standard communication. The accumulator unit is thus not exposed to overcharge with excessive electric power or to over-discharge to supply excessive electric power.

In the first power output apparatus of the invention, it is preferable that the drive control module inputs operation conditions of the power generation system and the motor, and verifies whether the operations of the power generation system and the motor by the operation commands are in the range of the input limit and the output limit of the accumulator unit, based on the operation conditions and the operation commands, when the operations of the power generation system and the motor by the operation commands are out of the range of the input limit and the output limit of the accumulator unit, the drive control module updating the operation commands to make the operations of the power generation system and the motor in the range of the input limit and the output limit and controlling the operations of the power generation system and the motor in response to the updated operation commands. The power generation system and the motor can thus be driven in the range of the input limit and the output limit of the accumulator unit. This arrangement effectively prevents the accumulator unit from being overcharged with excessive electric power or being over-discharged to supply excessive electric power.

In the first power output apparatus of the above application for updating the operation commands of the power generation system, it is preferable that when the operations of the power generation system and the motor by the operation commands are beyond the range of the input limit, the drive control module updates the operation command of the power generation system to make the operations of the power generation system and the motor approach to the range of the input limit, when the operations of the power generation system and the motor by the operation commands are beyond the range of the output limit, the drive control module updating the operation command of the motor to make the operations of the power generation system and the motor approach to the range of the output limit. This arrangement readily makes the operations of the power generation system and the motor in the range of the input limit and the output limit of the accumulator unit.

In the first power output apparatus of the above application for updating the operation commands of the power generation system and the motor to make the operations of the power generation system and the motor approach to the range of the input limit and the output limit of the accumulator unit, it is preferable that the drive control module updates the operation command of the motor under condition of no power generation by the motor to make the operations of the power generation system and the motor approach to the range of the output limit. This arrangement desirably prevents output of a torque in an unexpected reverse direction from the motor. In this structure, when the operations of the power generation system and the motor are still beyond the range of the output limit even after update of the operation command of the motor under condition of no power generation by the motor, the drive control module may further update the operation command of the power generation system to make the operations of the power generation system and the motor approach to the range of the output limit.

Furthermore, in the first power output apparatus of the above application for updating the operation commands of the power generation system and the motor to make the operations of the power generation system and the motor approach to the range of the input limit and the output limit of the accumulator unit, it is preferable that the power generation system includes an internal combustion engine and uses at least part of output power of the internal combustion engine to generate electric power, and when the drive control module updates the operation command of the power generation system to make the operations of the power generation system and the motor approach to the range of the input limit, the main control module controls the operation of the internal combustion engine to decrease the output power of the internal combustion engine. This arrangement effectively prevents a potential trouble, for example, rotation of the internal combustion engine at an expected high rotation speed, due to the update of the operation command of the power generation system.

In the first power output apparatus of the invention, it is preferable that the power generation system includes an internal combustion engine and uses at least part of output power of the internal combustion engine to generate electric power.

In one preferable structure of the first power output apparatus including the internal combustion engine as the power generation system, the power generation system includes an electric power-mechanical power input output mechanism that is connected with an output shaft of the internal combustion engine and with a driveshaft and outputs at least part of the output power of the internal combustion engine to the driveshaft through input and output of electric power and mechanical power. In one typical example of this structure, the electric power-mechanical power input output mechanism has: a three shaft-type power input output module that is linked to three shafts, the output shaft of the internal combustion engine, the driveshaft, and a rotating shaft, and inputs and outputs power from and to a residual one shaft based on powers input from and output to any two shafts among the three shafts; and a generator that inputs and outputs power from and to the rotating shaft. In another typical example of this structure, the electric power-mechanical power input output mechanism has a pair-rotor motor that has a first rotor connected to the output haft of the internal combustion engine and a second rotor connected to the driveshaft and is driven to rotate through relative rotation of the first rotor to the second rotor.

Furthermore, in one preferable structure of the power output apparatus, the power generation system comprises a fuel cell device including fuel cells.

The second power output apparatus of the invention is directed to a power output apparatus that outputs power, the power output apparatus includes: an internal combustion engine as a power source; a motor that outputs a driving power; an accumulator unit that transmits electric power to and from the motor; a power demand setting module that sets a power demand required for driving; a main control module that controls operation of the internal combustion engine and makes an operation command of the motor in a range of an input limit and an output limit of the accumulator unit, in order to satisfy the set power demand; and a drive control module that controls the operation of the motor in the range of the input limit and the output limit of the accumulator unit, in response to the operation command input from the main control module.

In the second power output apparatus of the invention, the main control module controls operation of the internal combustion engine and makes the operation commands of the motor in the range of the input limit and the output limit of the accumulator unit, in order to satisfy the set power demand. The drive control module controls the operations of the motor in the range of the input limit and the output limit of the accumulator unit, in response to the operation commands input from the main control module. There may be a time difference between the timing of making the operation commands by the main control module and the timing of controlling the operations of the motor by the drive control module, due to, for example, a communication lag. Even in such cases, the second power output apparatus of the invention causes the drive control module to control the operations of the motor in the range of the input limit and the output limit of the accumulator unit. This arrangement effectively prevents the accumulator unit from being overcharged with excessive electric power or being over-discharged to supply excessive electric power.

In the second power output apparatus of the invention, it is preferable that the drive control module inputs an operation condition of the motor, and verifies whether the operation of the motor by the operation command is in the range of the input limit and the output limit of the accumulator unit, based on the operation condition and the operation command, when the operation of the motor by the operation command is out of the range of the input limit and the output limit of the accumulator unit, the drive control module updating the operation command to make the operation of the motor in the range of the input limit and the output limit. The motor can be driven in the range of the input limit and the output limit of the accumulator unit. This arrangement effectively prevents the accumulator unit from being overcharged with excessive electric power or being over-discharged to supply excessive electric power.

The vehicle of the invention is equipped with either the first power output apparatus or the second power output apparatus having any of the arrangements described above. The vehicle of the invention is directed to a power output apparatus that outputs power, the vehicle equipped with the first power output apparatus includes: a power generation system that receives a supply of fuel to generate electric power; a motor that outputs a driving power; an accumulator unit that transmits electric power to and from the power generation system and the motor; a power demand setting module that sets a power demand required for driving; a main control module that makes operation commands of the power generation system and the motor in a range of an input limit and an output limit of the accumulator unit, in order to satisfy the set power demand; and a drive control module that controls operations of the power generation system and the motor in the range of the input limit and the output limit of the accumulator unit, in response to the operation commands input from the main control module, and the second power output apparatus includes: an internal combustion engine as a power source; a motor that outputs a driving power; an accumulator unit that transmits electric power to and from the motor; a power demand setting module that sets a power demand required for driving; a main control module that controls operation of the internal combustion engine and makes an operation command of the motor in a range of an input limit and an output limit of the accumulator unit, in order to satisfy the set power demand; and a drive control module that controls the operation of the motor in the range of the input limit and the output limit of the accumulator unit, in response to the operation command input from the main control module.

The vehicle of the invention is equipped with either the first power output apparatus or the second power output apparatus having any of the arrangements described above. The vehicle of the invention accordingly has the similar effects and advantages to those of the first power output apparatus or the second power output apparatus explained above. Such effects and advantages include the effective operation control of the power generation system and the motor in the range of the input limit and the output limit of the accumulator unit and the effective protection of the accumulator unit from overcharge with excessive electric power or from over-discharge to supply excessive electric power.

A control method of the first power output apparatus of the invention is directed to a control method of the power output apparatus, the power output apparatus includes: a power generation system that receives a supply of fuel to generate electric power; a motor that outputs a driving power; an accumulator unit that transmits electric power to and from the power generation system and the motor; and a control system that has multiple controllers including a first controller of making operation commands of the power generation system and the motor and a second controller of inputting operation conditions of the power generation system and the motor and controls the power generation system, the motor, and the accumulator unit, the control method includes the steps of: activating the first controller to set a power demand required for driving and to make the operation commands of the power generation system and the motor in a range of an input limit and an output limit of the accumulator unit, based on the set power demand and the operation conditions of the power generation system and the motor input into the second controller; and activating the second controller to control operations of the power generation system and the motor in the range of the input limit and the output limit of the accumulator unit, based on the operation commands made by the first controller and the input operation conditions of the power generation system and the motor.

In the first control method of the power output apparatus of the invention, the second controller controls the operations of the power generation system and the motor in the range of the input limit and the output limit of the accumulator unit, based on the operation commands of the power generation system and the motor made by the first controller and the input operation conditions of the power generation system and the motor. There may be a time difference between the timing of making the operation commands by the first controller and the timing of controlling the operations of the power generation system and the motor by the second controller, due to, for example, a communication lag. Even in such cases, the first control method of the invention causes the second controller to control the operations of the power generation system and the motor in the range of the input limit and the output limit of the accumulator unit. This arrangement effectively prevents the accumulator unit from being overcharged with excessive electric power or being over-discharged to supply excessive electric power.

A control method of the second power output apparatus of the invention is directed to a control method of the power output apparatus, the power output apparatus includes: an internal combustion engine as a power source; a motor that outputs a driving power; an accumulator unit that transmits electric power to and from the motor; and a control system that has multiple controllers including a first controller of making operation commands of the motor and a second controller of inputting operation conditions of the motor and controls the internal combustion engine, the motor, and the accumulator unit, the control method includes the steps of: activating the first controller to set a power demand required for driving and to make the operation commands of the internal combustion engine and the operation commands of the motor in a range of an input limit and an output limit of the accumulator unit, based on the set power demand and the operation conditions of the motor input into the second controller; and activating the second controller to control operations of the motor in the range of the input limit and the output limit of the accumulator unit, based on the operation commands of the motor made by the first controller and the input operation conditions of the motor.

In the second control method of the power output apparatus of the invention, the second controller controls the operations of the motor in the range of the input limit and the output limit of the accumulator unit, based on the operation commands of the motor made by the first controller and the input operation conditions of the motor. There may be a time difference between the timing of making the operation commands by the first controller and the timing of controlling the operations of the motor by the second controller, due to, for example, a communication lag. Even in such cases, the second control method of the invention causes the second controller to control the operations of the motor in the range of the input limit and the output limit of the accumulator unit. This arrangement effectively prevents the accumulator unit from being overcharged with excessive electric power or being over-discharged to supply excessive electric power.

The first control program of the invention is directed to the control program executed in the first controller of the power output apparatus, the power output apparatus includes: a power generation system that receives a supply of fuel to generate electric power; a motor that outputs a driving power; an accumulator unit that transmits electric power to and from the power generation system and the motor; and a control system that has multiple controllers including the first controller of making operation commands of the power generation system and the motor and a second controller of inputting operation conditions of the power generation system and the motor and controls the power generation system, the motor, and the accumulator unit, the control program includes: a module of setting a power demand required for driving; a module of inputting the operation conditions of the power generation system and the motor from the second controller; a module of making the operation commands of the power generation system and the motor in a range of an input limit and an output limit of the accumulator unit, based on the set power demand and the input operation conditions of the power generation system and the motor; and a module of sending the operation commands of the power generation system and the motor to the second controller.

The first control program of the invention is installed in and executed by the first controller of the control system that controls the power generation system, the motor, and the accumulator unit of the power output apparatus. The first control program sets the power demand required for driving, inputs the operation conditions of the power generation system and the motor from the second controller, makes the operation commands of the power generation system and the motor in the range of the input limit and the output limit of the accumulator unit, based on the set power demand and the input operation conditions of the power generation system and the motor, and sends the operation commands of the power generation system and the motor to the second controller. The operations of the power generation system and the motor are controlled in response to the operation commands. This ensures appropriate control of the power generation system and the motor.

The second control program of the invention is directed to the control program executed in the second controller of the power output apparatus, the power output apparatus includes: a power generation system that receives a supply of fuel to generate electric power; a motor that outputs a driving power; an accumulator unit that transmits electric power to and from the power generation system and the motor; and a control system that has multiple controllers including a first controller of making operation commands of the power generation system and the motor and the second controller of inputting operation conditions of the power generation system and the motor and controls the power generation system, the motor, and the accumulator unit, the control program includes: a module of inputting the operation commands of the power generation system and the motor from the first controller; and a module of inputting the operation conditions of the power generation system and the motor; and a module of controlling operations of the power generation system and the motor in a range of an input limit and an output limit of the accumulator unit, based on the input operation commands of the power generation system and the motor and the input operation conditions of the power generation system and the motor.

The second control program of the invention is installed in and executed by the second controller of the control system that controls the power generation system, the motor, and the accumulator unit of the power output apparatus. The second control program inputs the operation commands of the power generation system and the motor from the first controller, inputs the operation conditions of the power generation system and the motor, and controls the operations of the power generation system and the motor in the range of the input limit and the output limit of the accumulator unit, based on the input operation commands of the power generation system and the motor and the input operation conditions of the power generation system and the motor. There may be a time difference between the timing of making the operation commands by the first controller and the timing of controlling the operations of the power generation system and the motor by the second controller, due to, for example, a communication lag. Even in such cases, the second control program installed in and executed by the second controller controls the operations of the power generation system and the motor in the range of the input limit and the output limit of the accumulator unit. This arrangement effectively prevents the accumulator unit from being overcharged with excessive electric power or being over-discharged to supply excessive electric power.

The third control program of the invention is directed to the control program executed in the first controller of the power output apparatus, the power output apparatus includes: an internal combustion engine as a power source; a motor that outputs a driving power; an accumulator unit that transmits electric power to and from the motor; and a control system that has multiple controllers including a first controller of making operation commands of the motor and a second controller of inputting operation conditions of the motor and controls the internal combustion engine, the motor, and the accumulator unit, the control program includes: a module of setting a power demand required for driving; a module of inputting the operation conditions of the motor from the second controller; a module of making the operation commands of the internal combustion engine and the operation commands of the motor in a range of an input limit and an output limit of the accumulator unit, based on the set power demand and the input operation conditions of the motor; and a module of sending the operation commands of the motor to the second controller.

The third control program of the invention is installed in and executed by the first controller of the control system that controls the internal combustion engine, the motor, and the accumulator unit of the power output apparatus. The third control program sets the power demand required for driving, inputs the operation condition of the motor from the second controller, makes the operation commands of the internal combustion engine and the motor in the range of the input limit and the output limit of the accumulator unit, based on the set power demand and the input operation condition of the motor, and sends the operation command of the motor to the second controller. The operations of the internal combustion engine and the motor are controlled in response to the respective operation commands. This ensures appropriate control of the internal combustion engine and the motor.

The fourth control program of the invention is directed to the control program executed in the second controller of the power output apparatus, the power output apparatus includes:

an internal combustion engine as a power source; a motor that outputs a driving power; an accumulator unit that transmits electric power to and from the motor; and a control system that has multiple controllers including a first controller of making operation commands of the motor and a second controller of inputting operation conditions of the motor and controls the internal combustion engine, the motor, and the accumulator unit, the control program includes: a module of inputting the operation commands of the motor from the first controller; a module inputting the operation conditions of the motor; and a module of controlling operations of the motor in a range of an input limit and an output limit of the accumulator unit, based on the input operation commands of the motor and the input operation conditions of the motor.

The fourth control program of the invention is installed in and executed by the second controller of the control system that controls the internal combustion engine, the motor, and the accumulator unit of the power output apparatus. The fourth control program inputs the operation command of the motor from the first controller, inputs the operation condition of the motor, and controls the operation of the motor in the range of the input limit and the output limit of the accumulator unit, based on the input operation command of the motor and the input operation condition of the motor. There may be a time difference between the timing of making the operation command by the first controller and the timing of controlling the operation of the motor by the second controller, due to, for example, a communication lag. Even in such cases, the fourth control program installed in and executed by the second controller controls the operation of the motor in the range of the input limit and the output limit of the accumulator unit. This arrangement effectively prevents the accumulator unit from being overcharged with excessive electric power or being over-discharged to supply excessive electric power.

BEST MODES OF CARRYING OUT THE INVENTION

Figure 1:
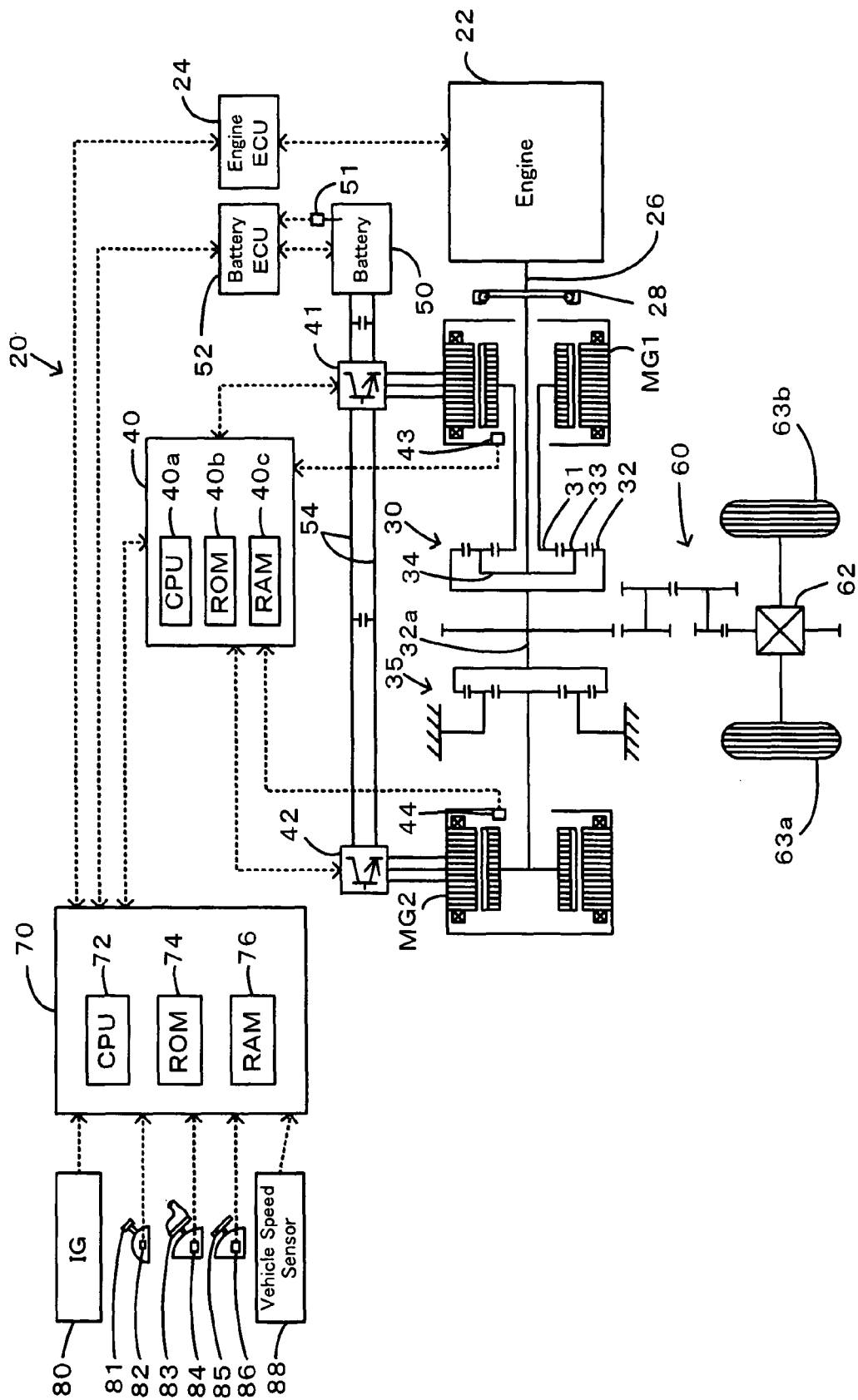
FIG. 1 schematically illustrates the configuration of a hybrid vehicle in one embodiment of the invention.

One mode of carrying out the invention is discussed below as a preferred embodiment. FIG. 1 schematically illustrates the construction of a hybrid vehicle 20 with a power output apparatus mounted thereon in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. Operations of both the motors MG1 and MG2 are controlled by a motor electronic control unit (hereafter referred to as motor ECU) 40. The motor ECU 40 is constructed as a microprocessor including a CPU 40a, a ROM 40b that stores processing programs, a RAM 40c that temporarily stores data, and a non-illustrated input-output port, and a non-illustrated communication port. The motor ECU 40 receives diverse signals via the input port required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals via the output port to the inverters 41 and 42. The motor ECU 40 communicates via the communication port with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

Figure 2:
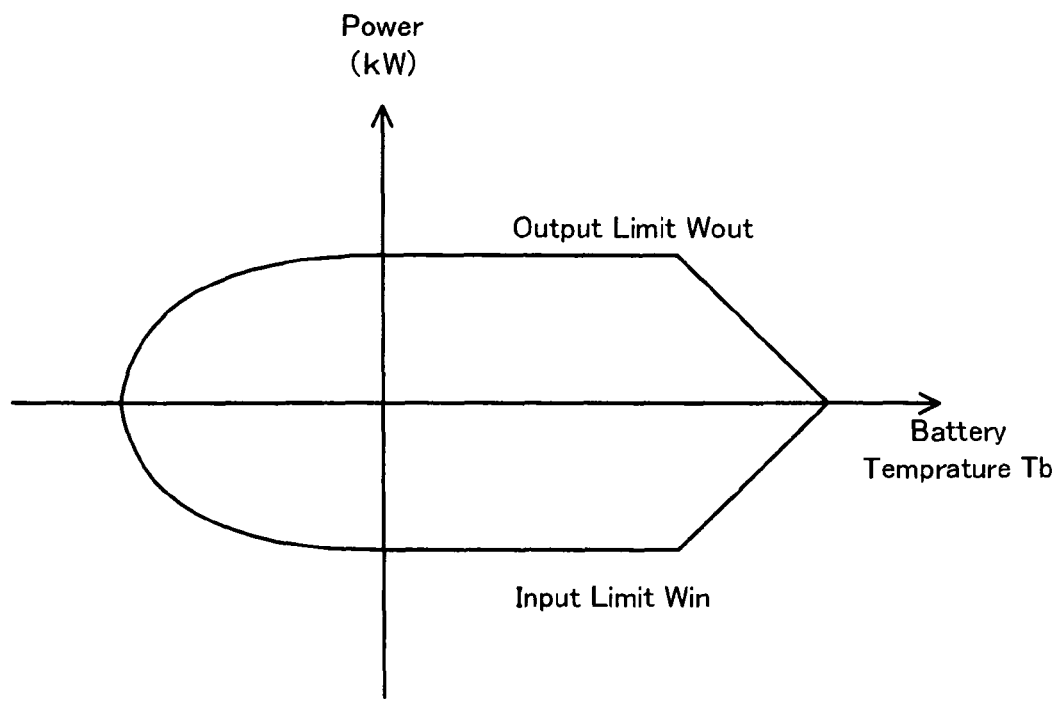
FIG. 2 shows variations of an input limit Win and an output limit Wout against battery temperature Tb of a battery.
Figure 3:
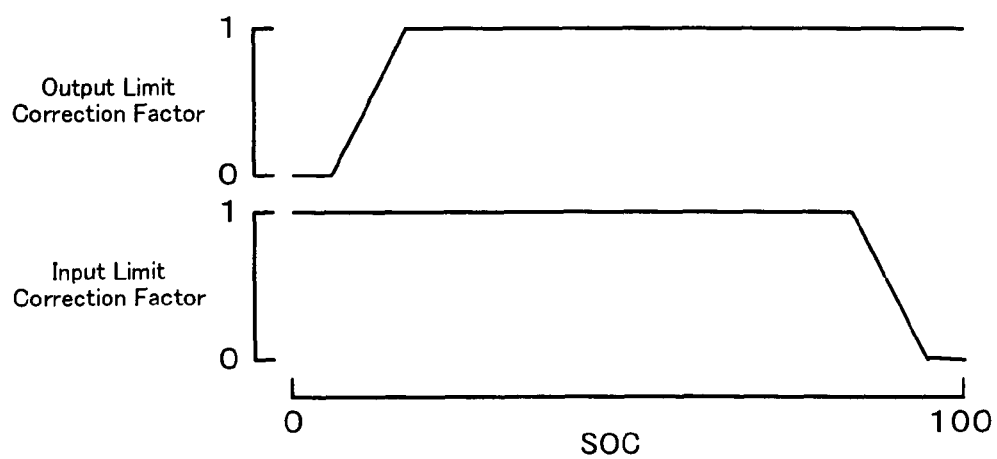
FIG. 3 shows variations of an input limit correction factor and an output limit correction factor against state of charge SOC of the battery.

The battery 50 is under control and management of a battery electronic control unit (hereafter referred to as battery ECU) 52. The battery ECU 52 inputs signals required for management and control of the battery 50, for example, an inter-terminal voltage from a voltage sensor (not shown) located between terminals of the battery 50, a charge-discharge current from a current sensor (not shown) located in the power line 54 connecting with an output terminal of the battery 50, and a battery temperature Tb from a temperature sensor 51 attached to the battery 50. The battery ECU 52 computes a remaining charge level or current state of charge SOC, a charge-discharge power demand Pb*, an input limit Win, and an output limit Wout of the battery 50, based on these inputs. The state of charge SOC of the battery 50 is computed from an integration of the charge-discharge current measured by the current sensor. The charge-discharge power demand Pb* is set according to the state of charge SOC. The input limit Win and the output limit Wout of the battery 50 are computed by setting base values of the input limit Win and the output limit Wout corresponding to the battery temperature Tb, specifying an input limit correction factor and an output limit correction factor corresponding to the state of charge SOC of the battery 50, and multiplying the base values of the input limit Win and the output limit Wout by the specified input limit correction factor and output limit correction factor. FIG. 2 shows variations of the input limit Win and the output limit Wout against the battery temperature Tb. FIG. 3 shows variations of the input limit correction factor and the output limit correction factor against the state of charge SOC of the battery 50. The battery ECU 52 makes communication with the hybrid electronic control unit 70 and outputs data regarding the conditions of the battery 50, for example, the state of charge SOC, the charge-discharge power demand Pb*, and the input and output limits Win and Wout, to the hybrid electronic control unit 70 in response to control signals from the hybrid electronic control unit 70.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 4:
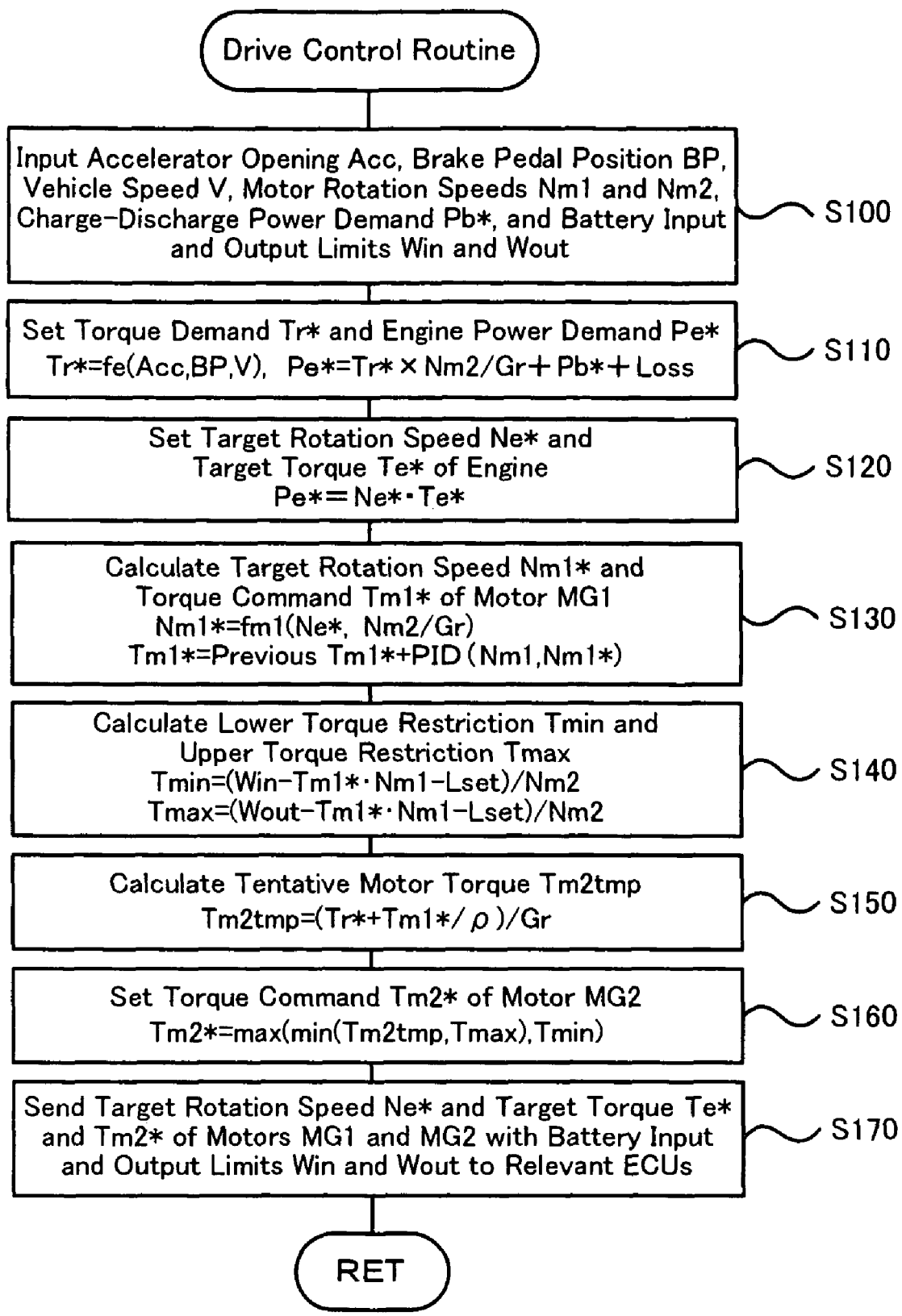
FIG. 4 is a flowchart showing a drive control routine executed by a hybrid electronic control unit mounted on the hybrid vehicle of the embodiment.

The description regards the operations of the hybrid vehicle 20 of the embodiment having the configuration discussed above. FIG. 4 is a flowchart showing a drive control routine executed by the hybrid electronic control unit 70 in the hybrid vehicle 20 of the embodiment. This drive control routine is performed repeatedly at preset time intervals, for example, at every several msec.

In the drive control routine of FIG. 4, the CPU 72 of the hybrid electronic control unit 70 first inputs various data required for control, that is, the accelerator opening Acc from the accelerator pedal position sensor 84, the brake pedal position BP from the brake pedal position sensor 86, the vehicle speed V from the vehicle speed sensor 88, rotation speeds Nm1 and Nm2 of the motors MG1 and MG2, the charge-discharge power demand Pb*, and the input limit Win and the output limit Wout of the battery 50 (step S100). The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The charge-discharge power demand Pb* and the input limit Win and the output limit Wout of the battery 50 are set or computed by the battery ECU 52 and are received by communication.

Figure 5:
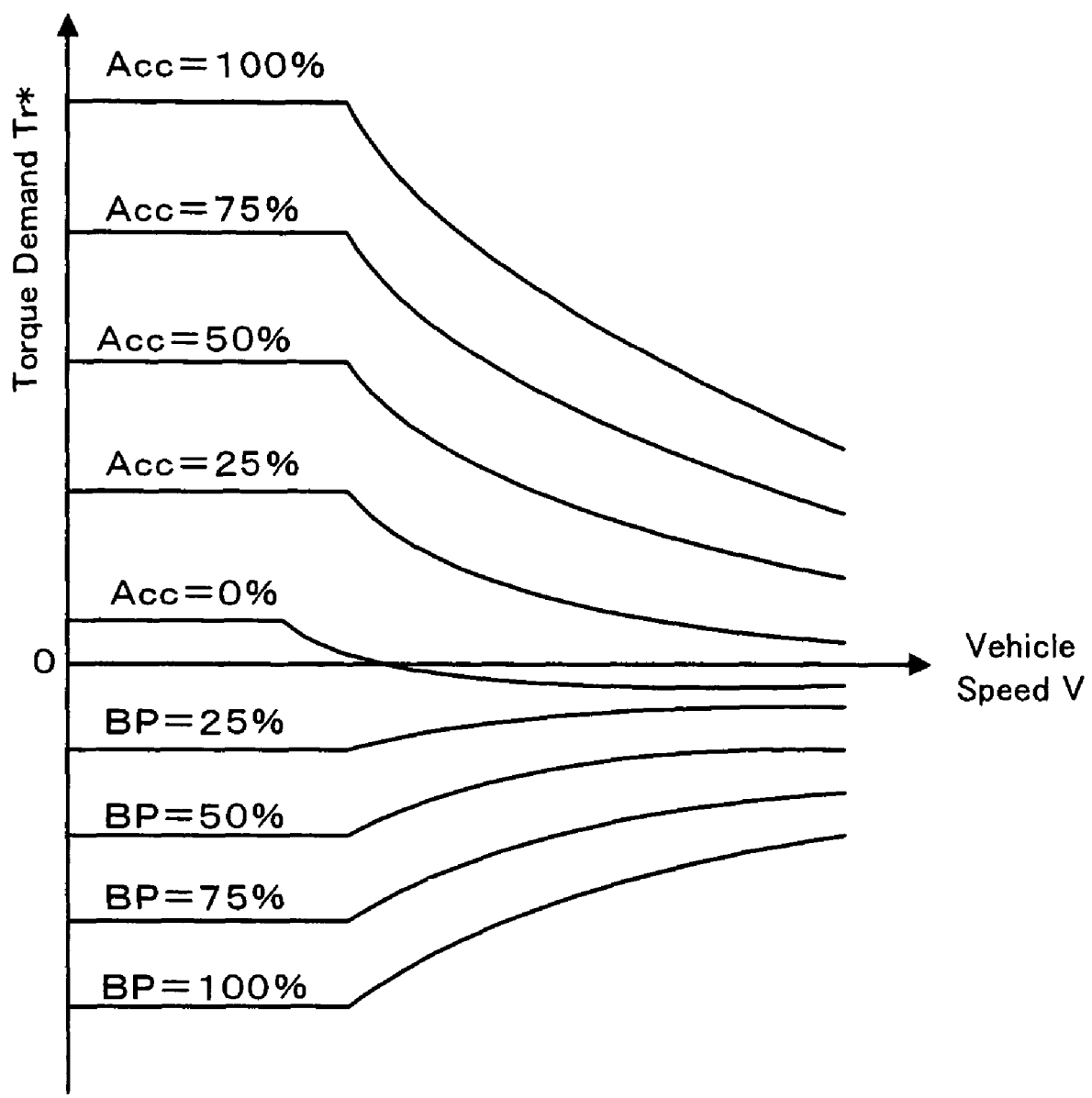
FIG. 5 shows one example of a torque demand setting map.

After the data input, the CPU 72 sets a torque demand Tr* to be output to the ring gear shaft 32a or a driveshaft linked with the drive wheels 63a and 63b as a torque required for the hybrid vehicle 20 and an engine power demand Pe* to be output from the engine 22, based on the input accelerator opening Acc, the input brake pedal position BP, and the input vehicle speed V (step S110). A concrete procedure of setting the torque demand Tr* in this embodiment stores in advance variations in torque demand Tr* against the accelerator opening Acc or the brake pedal position BP and the vehicle speed V as a torque demand setting map in the ROM 74 and reads the torque demand Tr* corresponding to the given accelerator opening Acc or brake pedal position BP and the given vehicle speed V from this torque demand setting map. One example of the torque demand setting map is shown in FIG. 5. The engine power demand Pe* is calculated as the sum of the product of the torque demand Tr* and a rotation speed Nr of the ring gear shaft 32a, the charge-discharge power demand Pb* to be charged into or discharged from the battery 50, and a potential loss. The rotation speed Nr of the ring gear shaft 32a is obtained by multiplying the vehicle speed V by a preset conversion factor k or by dividing the rotation speed Nm2 of the motor MG2 by a gear ratio Gr of the reduction gear 35.

Figure 6:
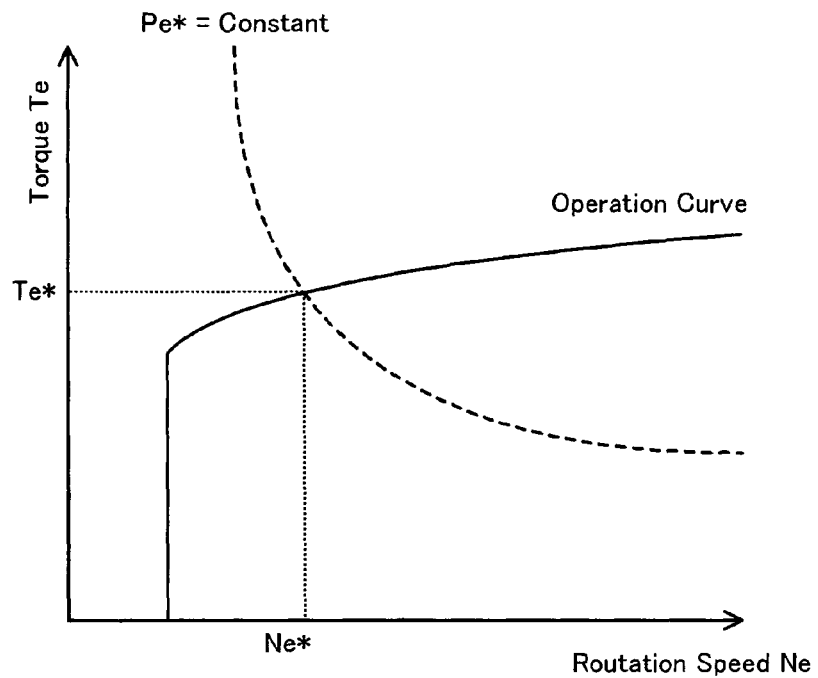
FIG. 6 shows an efficient operation line of an engine to set a target rotation speed Ne* and a target torque Te*.

The CPU 72 subsequently sets a target rotation speed Ne* and a target torque Te* of the engine 22 corresponding to the engine power demand Pe* (step S120). The target rotation speed Ne* and the target torque Te* of the engine 22 are determined according to an efficient operation line of ensuring efficient operations of the engine 22 and a curve of the engine power demand Pe*. FIG. 6 shows an efficient operation line of the engine 22 to set the target rotation speed Ne* and the target torque Te*. As clearly shown in FIG. 6, the target rotation speed Ne* and the target torque Te* are given as an intersection of the efficient operation line and a curve of constant engine power demand Pe* (=Ne*×Te*).

The CPU 72 calculates a target rotation speed Nm1* of the motor MG1 from the target rotation speed Ne* of the engine 22, the rotation speed Nr (=Nm2/Gr) of the ring gear shaft 32a, and a gear ratio ρ of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S130):

$$Nm1^* = Ne^* \cdot (1+\rho)/\rho - Nm2/(Gr \cdot \rho) \quad (1)$$

$$Tm1^* = PreviousTm1^* + k1(Nm1^* - Nm1) + k2\int(Nm1^* - Nm1)dt \quad (2)$$

Figure 7:
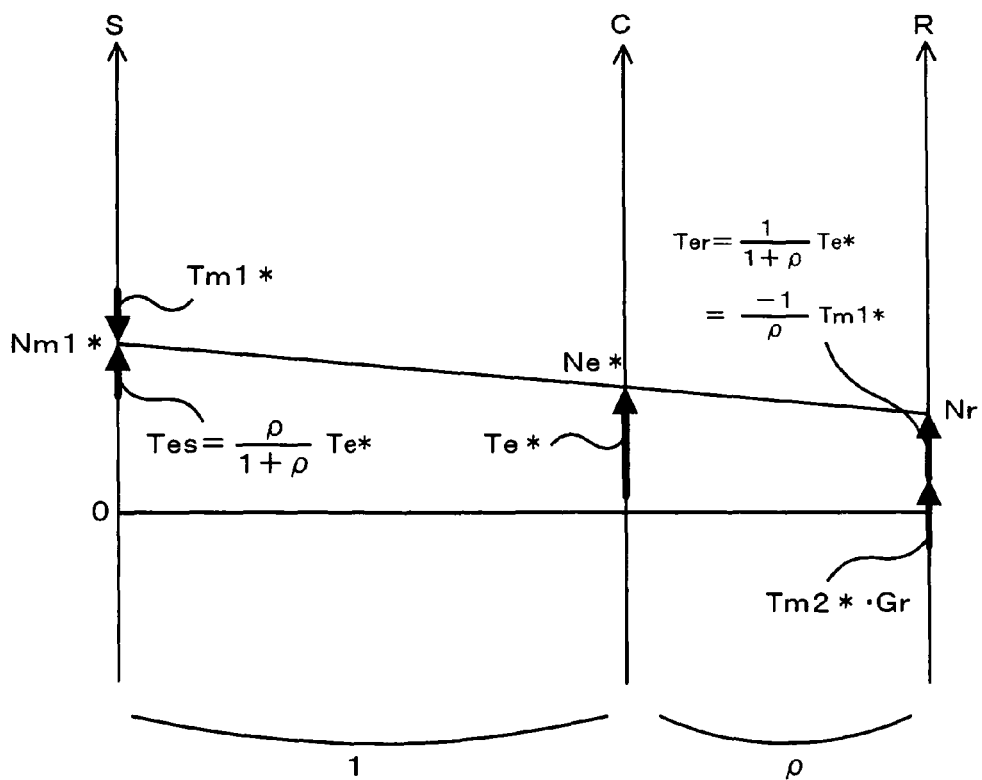
FIG. 7 is an alignment chart showing torque-rotation speed dynamics of respective rotation elements included in a power distribution integration mechanism mounted on the hybrid vehicle of the embodiment.

Equation (1) is a dynamic relational expression of the rotation elements included in the power distribution integration mechanism 30. FIG. 7 is an alignment chart showing torque-rotation speed dynamics of the respective rotation elements included in the power distribution integration mechanism 30. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 obtained by multiplying the rotation speed Nm2 of the motor MG2 by the gear ratio Gr of the reduction gear 35. Equation (1) is readily introduced from the alignment chart of FIG. 7. Two upward thick arrows on the axis 'R' in FIG. 7 respectively show a torque transmitted to the ring gear shaft 32a when the torque Te* is output from the engine 22 in steady operation at a specific drive point of the target rotation speed Ne* and the target torque Te*, and a torque applied to the ring gear shaft 32a via the reduction gear 35 when a torque Tm2* is output from the motor MG2. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term.

After calculation of the target rotation speed Nm1* and the torque command Tm1* of the motor MG1, the CPU 72 calculates a lower torque restriction Tmin and an upper torque restriction Tmax as minimum and maximum torques output from the motor MG2 according to Equations (3) and (4) given below (step S140):

$$Tmin = (Win - Tm1^* \cdot Nm1 - Lset)/Nm2 \quad (3)$$

$$Tmax = (Wout - Tm1^* \cdot Nm1 - Lset)/Nm2 \quad (4)$$

The lower torque restriction Tmin is given by subtracting the product of the torque command Tm1* and the input current rotation speed Nm1 of the motor MG1, which represents power consumption (power generation) of the motor MG1, and a potential loss Lset from the input limit Win of the battery 50 and dividing the result of subtraction by the input current rotation speed Nm2 of the motor MG2. The upper torque restriction Tmax is given by subtracting the product of the torque command Tm1* and the input current rotation speed Nm1 of the motor MG1 and the potential loss Lset from the output limit Wout of the battery 50 and dividing the result of subtraction by the input current rotation speed Nm2 of the motor MG2. The CPU 72 then calculates a tentative motor torque Tm2tmp to be output from the motor MG2 from the torque demand Tr*, the torque command Tm1* of the motor MG1, the gear ratio ρ of the power distribution integration mechanism 30, and the gear ratio Gr of the reduction gear 35 according to Equation (5) given below (step S150):

$$Tm2tmp = (Tr^* + Tm1^*/\rho)/Gr \quad (5)$$

The CPU 72 limits the tentative motor torque Tm2tmp to the range between the calculated lower torque restriction Tmin and upper torque restriction Tmax to set a torque command Tm2* of the motor MG2 (step S160). The potential loss Lset includes a loss Lm1 of the motor MG1, a loss Lm2 of the motor MG2, an auxiliary machinery loss La, and a capacitor charge-discharge electric power Pc. The auxiliary machinery loss La and the capacitor charge-discharge electric power Pc are set according to different routines (not shown). Setting the torque command Tm2* of the motor MG2 in this manner restricts the torque demand Tr* to be output to the ring gear shaft 32a or the driveshaft within the range between the input limit Win and the output limit Wout of the battery 50. Equation (5) is readily introduced from the alignment chart of FIG. 7.

After setting the target rotation speed Ne* and the target torque Te* of the engine 22 and the torque commands Tm1* and Tm2* of the motors MG1 and MG2, the CPU 72 sends the target rotation speed Ne* and the target torque Te* to the engine ECU 24 and the torque commands Tm1* and Tm2* with the input limit Win and the output limit Wout of the battery 50 to the motor ECU 40 (step S170), and then exits from the drive control routine of FIG. 4. The engine ECU 24 receives the target rotation speed Ne* and the target torque Te* of the engine 22 and performs fuel injection control and ignition control to drive the engine 22 at the specified drive point defined by the target rotation speed Ne* and the target torque Te*. The motor ECU 40 receives the torque commands Tm1* and Tm2* of the motors MG1 and MG2 and the input and output limits Win and Wout of the battery 50 and executes a motor control routine of FIG. 8 to drive and control the motors MG1 and MG2. The details of the motor control are described with reference to the motor control routine (FIG. 8) executed by the motor ECU 40. The motor control routine is repeatedly performed by the motor ECU 40 at preset time intervals, for example, at every several msec.

Figure 8:
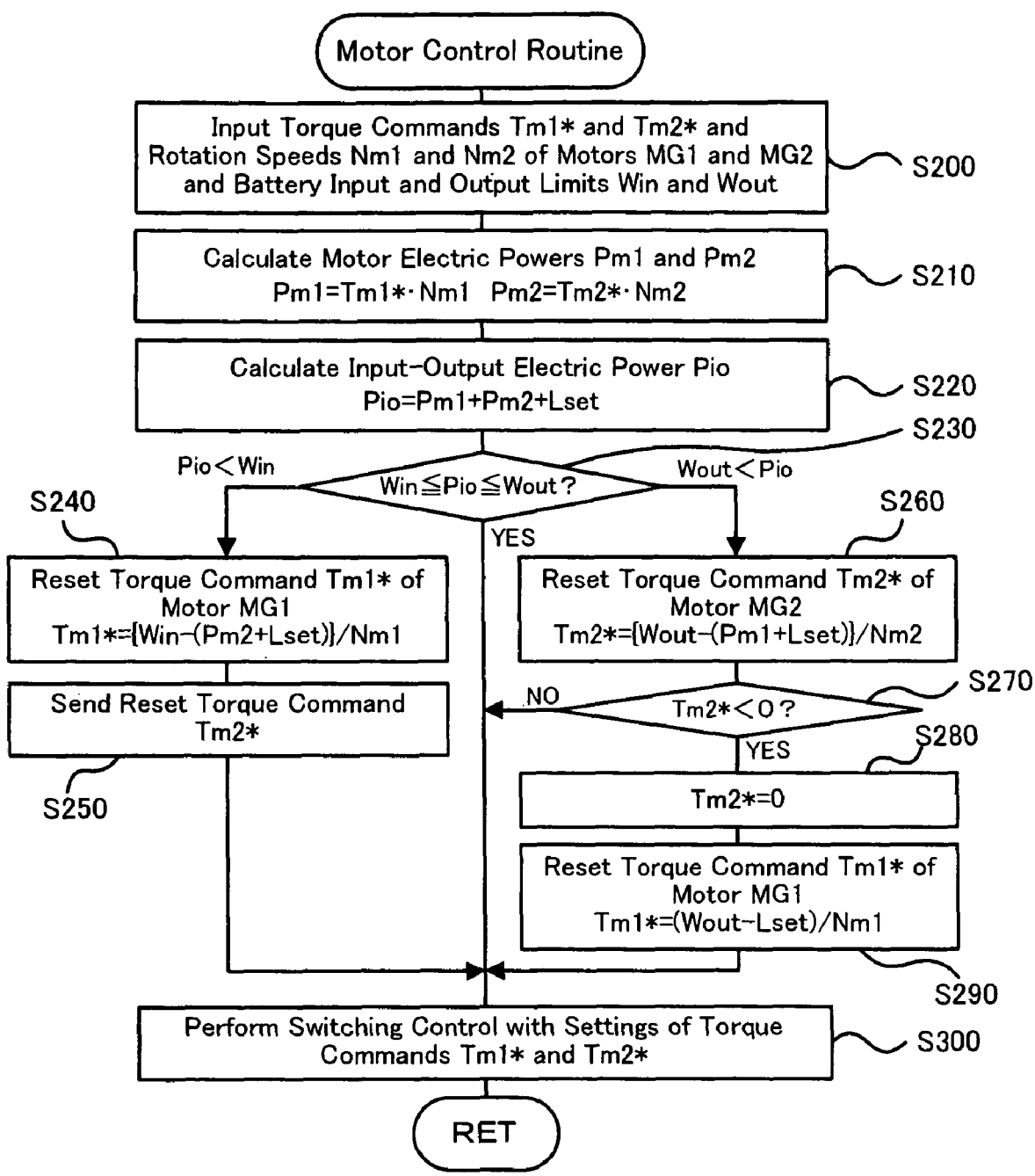
FIG. 8 is a flowchart showing a motor control routine executed by a motor ECU mounted on the hybrid vehicle of the embodiment.

In the motor control routine of FIG. 8, the CPU 40a of the motor ECU 40 first inputs various data required for control, that is, the torque commands Tm1* and Tm2* and the rotation speeds Nm1 and Nm2 of the motors MG1 and MG2 and the input limit Win and the output limit Wout of the battery 50 (step S200). The torque commands Tm1* and Tm2* and the input limit Win and the output limit Wout of the battery 50 input here have been received in advance from the hybrid electronic control unit 70 and written at a specified address in the RAM 40c. The rotation speeds Nm1 and Nm2 of the motors MG1 and MG2 input here have been computed in advance from the rotational positions of the respective rotors in the motors MG1 and MG2 detected by the rotational position detection sensors 43 and 44 according to a rotation speed computation routine (not shown) and written in the RAM 40c.

After the data input, the CPU 40a multiplies the torque command Tm1* by the rotation speed Nm1 of the motor MG1 and the torque command Tm2* by the rotation speed Nm2 of the motor MG2 to calculate motor electric powers Pm1 and Pm2 of the motors MG1 and MG2 (step S210). The motor electric power Pm1 (Pm2) is given as a level of electric power consumed or generated by the motor MG1 (MG2) driven with the torque command Tm1* (Tm2*). An input-output electric power Pio of the battery 50 is then calculated by summing up the calculated motor electric power Pm1, the calculated motor electric power Pm2, and a potential loss Lset (step S220). The calculated input-output electric power Pio is compared with the input limit Win and the output limit Wout of the battery 50 (step S230). The torque commands Tm1* and Tm2* of the motors MG1 and MG2 have been set by the hybrid electronic control unit 70 to be within the range of the input limit Win and the output limit Wout of the battery 50. The calculated input-output electric power Pio is expected to enter the range of the input limit Win and the output limit Wout of the battery 50 without consideration of the activation frequency of the motor control routine and a possible communication lag. In the actual state, however, the activation frequency of the motor control routine by the motor ECU 40 may be higher than the activation frequency of the drive control routine (see FIG. 4) by the hybrid electronic control unit 70. There may also be a delay (communication lag) based on the time required for communication from the hybrid electronic control unit 70 to the motor ECU 40. The communication lag or the different activation frequency may cause the rotation speeds Nm1 and Nm2 of the motors MG1 and MG2 during the motor control by the motor ECU 40 to be varied from the rotation speeds Nm1 and Nm2 of the motors MG1 and MG2 during the drive control by the hybrid electronic control unit 70 for setting the torque commands Tm1* and Tm2*. In such cases, the calculated input-output electric power Pio is out of the range of the input limit Win and the output limit Wout of the battery 50.

When the calculated input-output electric power Pio is within the range of the input limit Win and the output limit Wout of the battery 50 at step S230, that is, when the input-output electric power Pio is not less than the input limit Win and is not greater than the output limit Wout, there is no fear that the battery 50 is overcharged with excessive electric power or is over-discharged to supply excessive electric power. In this case, the motor ECU 40 performs switching control of switching elements included in the inverters 41 and 42 to ensure output of the torque commands Tm1* and Tm2* set by the hybrid electronic control unit 70 from the motors MG1 and MG2 (step S300) and then terminates the motor control routine of FIG. 8. The motors MG1 and MG2 accordingly output torques equivalent to the torque commands Tm1* and Tm2*.

When the calculated input-output electric power Pio is less than the input limit Win of the battery 50 at step S230, there is a fear that the battery 50 is overcharged with excessive electric power. In this case, the motor ECU 40 resets the torque command Tm1* of the motor MG1 according to Equation (6) given below to make the input-output electric power Pio equal to or greater than the input limit Win of the battery 50 (step S240):

$$Tm1^* = [Win - (Pm2 + Lset)]/Nm1 \qquad (6)$$

The reset torque command Tm1* is sent to the hybrid electronic control unit 70 (step S250). The motor ECU 40 performs switching control of the switching elements included in the inverters 41 and 42 to ensure output of the reset torque command Tm1* from the motor MG1 and output of the torque command Tm2* set by the hybrid electronic control unit 70 from the motor MG2 (step S300) and then terminates the motor control routine of FIG. 8. This arrangement effectively prevents the battery 50 from being overcharged with excessive electric power. The rotating shaft of the motor MG1 is connected to the crankshaft 26 of the engine 22 by means of the power distribution integration mechanism 30. The change of the output torque of the motor MG1 may thus increase the rotation speed Ne of the engine 22 to an unexpected high level. The motor ECU 40 sends the reset torque command Tm1* of the motor MG1 to the hybrid electronic control unit 70 at step S250 to prevent rotation of the engine 22 at the unexpected high level. The hybrid electronic control unit 70 receives the reset torque command Tm1* and sends a control signal for changing the air intake timing, a control signal for changing the amount of fuel injection, and a control signal for changing the ignition timing to the engine ECU 24, in order to prevent an abrupt increase in rotation speed Ne of the engine 22. The engine ECU 24 performs the air intake regulation, the fuel injection control, and the ignition control of the engine 22 in response to these received control signals. Such control effectively prevents rotation of the engine 22 at the unexpected high level.

When the calculated input-output electric power Pio is greater than the output limit Wout of the battery 50 at step S230, there is a fear that the battery 50 is over-discharged to supply excessive electric power. In this case, the motor ECU 40 resets the torque command Tm2* of the motor MG2 according to Equation (7) given below to make the input-output electric power Pio equal to or less than the output limit Wout of the battery 50 (step S260):

$$Tm2^* = [Wout - (Pm1 + Lset)]/Nm2 \qquad (7)$$

It is then determined whether the reset torque command Tm2* is less than 0 (step S270). When the reset torque command Tm2* is not less than 0 (step S270: no), the motor ECU 40 performs switching control of the switching elements included in the inverters 41 and 42 to ensure output of the torque command Tm1* set by the hybrid electronic control unit 70 from the motor MG1 and output of the reset torque command Tm2* from the motor MG2 (step S300) and then terminates the motor control routine of FIG. 8. When the reset torque command Tm2* is less than 0 (step S270: yes), on the other hand, the torque command Tm2* is set to 0 (step S280). The motor ECU 40 then resets the torque command Tm1* of the motor MG1 according to Equation (8) given below to make the input-output electric power Pio equal to or less than the output limit Wout of the battery 50 in the state that the torque command Tm2* equal to 0 is output from the motor MG2 (step S290):

$$Tm1^* = (Wout - Lset)/Nm1 \quad (8)$$

The motor ECU 40 performs switching control of the switching elements included in the inverters 41 and 42 to ensure output of the reset torque command Tm1* from the motor MG1 and output of the reset torque command Tm2* from the motor MG2 (step S300) and then terminates the motor control routine of FIG. 8. This arrangement effectively prevents the battery 50 from being over-discharged to supply excessive electric power. When the reset torque command Tm2* is less than 0, the motor control routine sets the torque command Tm2* to 0 and resets the torque command Tm1* of the motor MG1 to make the input-output electric power Pio equal to or less than the output limit Wout of the battery 50. Such control aims to prevent unexpected behaviors of the hybrid vehicle 20. When the torque command Tm2* of the motor MG2 is less than 0, the motor MG2 regenerates electric power and outputs a braking torque during the forward drive of the hybrid vehicle 20 while outputting a reverse torque during a stop of the hybrid vehicle 20. This may cause the hybrid vehicle 20 to have the driver's unexpected behavior. The above series of control prevents the unexpected behavior of the hybrid vehicle 20. Equation (8) does not include a term of the motor electric power Pm2, since the torque command Tm2* is set to 0.

In the hybrid vehicle 20 of the embodiment described above, the motor ECU 40 resets the torques Tm1* and Tm2* of the motors MG1 and MG2 to make the input-output electric power Pio within the range of the input limit Win and the output limit Wout of the battery 50, when there is a communication lag between the hybrid electronic control unit 70 and the motor ECU 40 or when there is a difference between the activation frequency of the drive control routine by the hybrid electronic control unit 70 and the activation frequency of the motor control routine by the motor ECU 40. The motors MG1 and MG2 can thus be driven in the range of the input limit Win and the output limit Wout of the battery 50. This arrangement effectively prevents the battery 50 from being overcharged with excessive electric power or being over-discharged to supply excessive electric power. When the input-output electric power Pio is less than the input limit Win of the battery 50, the torque command Tm1* of the motor MG1 under standard power generation control (regeneration control) is reset to make the input-output electric power Pio equal to or greater than the input limit Win of the battery 50. The motors MG1 and MG2 can thus be readily driven in the range of the input limit Win and the output limit Wout of the battery 50. The reset torque command Tm1* is sent to the hybrid electronic control unit 70, which then sends the control signals to the engine ECU 24 to prevent an abrupt increase in rotation speed Ne of the engine 22. This effectively prevents the rotation speed Ne of the engine 22 from increasing to the unexpected high level, due to the resetting of the torque command Tm1*. When the input-output electric power Pio is greater than the output limit Wout of the battery 50, on the other hand, the torque command Tm2* of the motor MG2 under standard drive control (power control) is reset to make the input-output electric power Pio equal to or less than the output limit Wout of the battery 50. The motors MG1 and MG2 can thus be readily driven in the range of the input limit Win and the output limit Wout of the battery 50. When the reset torque command Tm2* is less than 0, the motor control sets the torque command Tm2* to 0 and resets the torque command Tm1* of the motor MG1 to make the input-output electric power Pio equal to or less than the output limit Wout of the battery 50. This effectively prevents potential troubles, for example, the unexpected behavior of the hybrid vehicle 20, due to the setting of the torque command Tm2* less than 0.

In the hybrid vehicle 20 of the embodiment, when the input-output electric power Pio is less than the input limit Win of the battery 50, the motor control resets the torque command Tm1* of the motor MG1 to make the input-output electric power Pio equal to or greater than the input limit Win of the battery 50. One modified flow of the motor control may reset both the torque command Tm1* of the motor MG1 and the torque command Tm2* of the motor MG2 to make the input-output electric power Pio equal to or greater than the input limit Win of the battery 50. Another modified flow of the motor control may reset only the torque command Tm2* of the motor MG2 to make the input-output electric power Pio equal to or greater than the input limit Win of the battery 50.

In the hybrid vehicle 20 of the embodiment, when the input-output electric power Pio is greater than the output limit Wout of the battery 50, the motor control resets the torque command Tm2* of the motor MG2 to make the input-output electric power Pio equal to or less than the output limit Wout of the battery 50. One modified flow of the motor control may reset both the torque command Tm1* of the motor MG1 and the torque command Tm2* of the motor MG2 to make the input-output electric power Pio equal to or less than the output limit Wout of the battery 50. Another modified flow of the motor control may reset only the torque command Tm1* of the motor MG1 to make the input-output electric power Pio equal to or less than the output limit Wout of the battery 50.

In the hybrid vehicle 20 of the embodiment, when the input-output electric power Pio is less than the input limit Win of the battery 50, the torque command Tm1* of the motor MG1 is reset and is sent to the hybrid electronic control unit 70. The transmission of the reset torque command Tm1* to the hybrid electronic control unit 70 is, however, not essential but may be omitted.

In the hybrid vehicle 20 of the embodiment, the input limit Win and the output limit Wout of the battery 50 are sent simultaneously with the torque commands Tm1* and Tm2* from the hybrid electronic control unit 70 to the motor ECU 40. The motor ECU 40 may alternatively receive the input limit Win and the output limit Wout of the battery 50 from the battery ECU 52.

Figure 9:
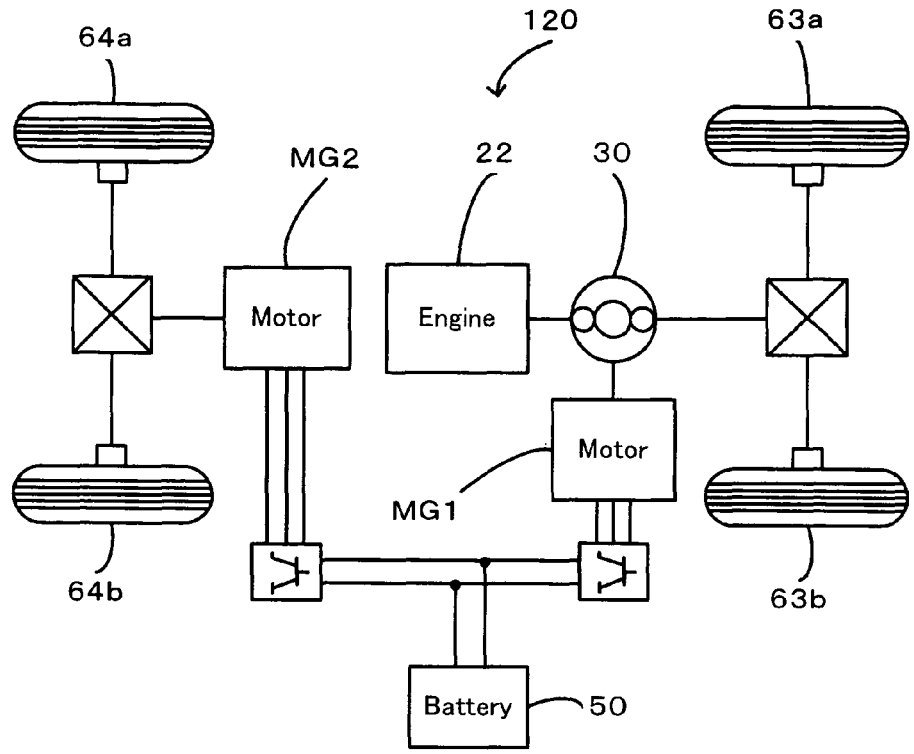
FIG. 9 schematically illustrates the configuration of another hybrid vehicle in one modified example.

In the hybrid vehicle 20 of the embodiment, the power of the motor MG2 goes through shift transmission by the reduction gear 35 and is output to the ring gear shaft 32a. The principle of the invention is also applicable to a hybrid vehicle 120 of a modified structure shown in FIG. 9, where the power of the motor MG2 is output to another axle (axle connected with wheels 64a and 64b in FIG. 9) that is different from the axle linked to the ring gear shaft 32a (axle connected with the drive wheels 63a and 63b).

Figure 10:
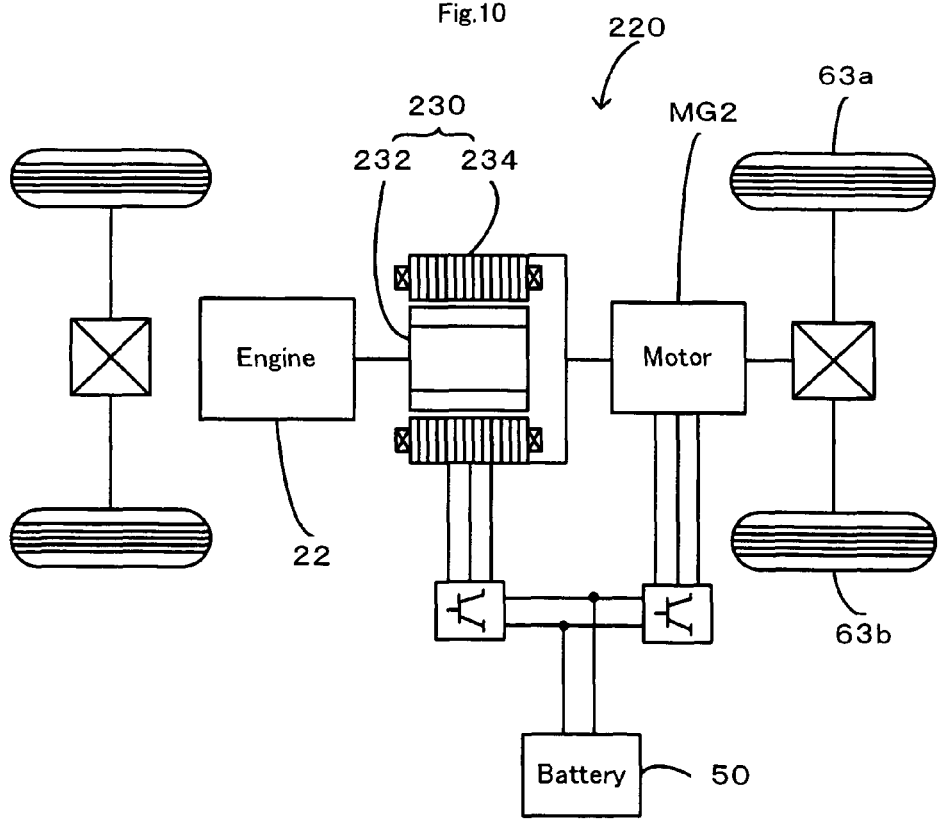
FIG. 10 schematically illustrates the configuration of still another hybrid vehicle in another modified example.

In the hybrid vehicle 20 of the embodiment, the power of the engine 22 is output via the power distribution integration mechanism 30 to the ring gear shaft 32a or the driveshaft linked with the drive wheels 63a and 63b. The principle of the invention is also applicable to a hybrid vehicle 220 of another modified structure shown in FIG. 10, which is equipped with a pair-rotor motor 230. The pair-rotor motor 230 includes an inner rotor 232 connected to the crankshaft 26 of the engine 22 and an outer rotor 234 connected to a driveshaft that outputs power to the drive wheels 63a and 63b. The pair-rotor motor 230 transmits part of the output power of the engine 22 to the driveshaft, while converting the residual engine output power into electric power.

The hybrid vehicle 20 of the embodiment is equipped with the engine 22, the power distribution integration mechanism 30, the two motors MG1 and MG2, and the battery 50, as well as with the hybrid electronic control unit 70 for controlling the operations of the whole vehicle system and the motor ECU 40 for controlling the motors MG1 and MG2. The principle of the invention is applicable to a hybrid vehicle of any other structure that is essentially equipped with an engine, a drive motor, a battery, a control device for controlling the whole vehicle system, and another control device for driving and controlling the drive motor.

Figure 11:
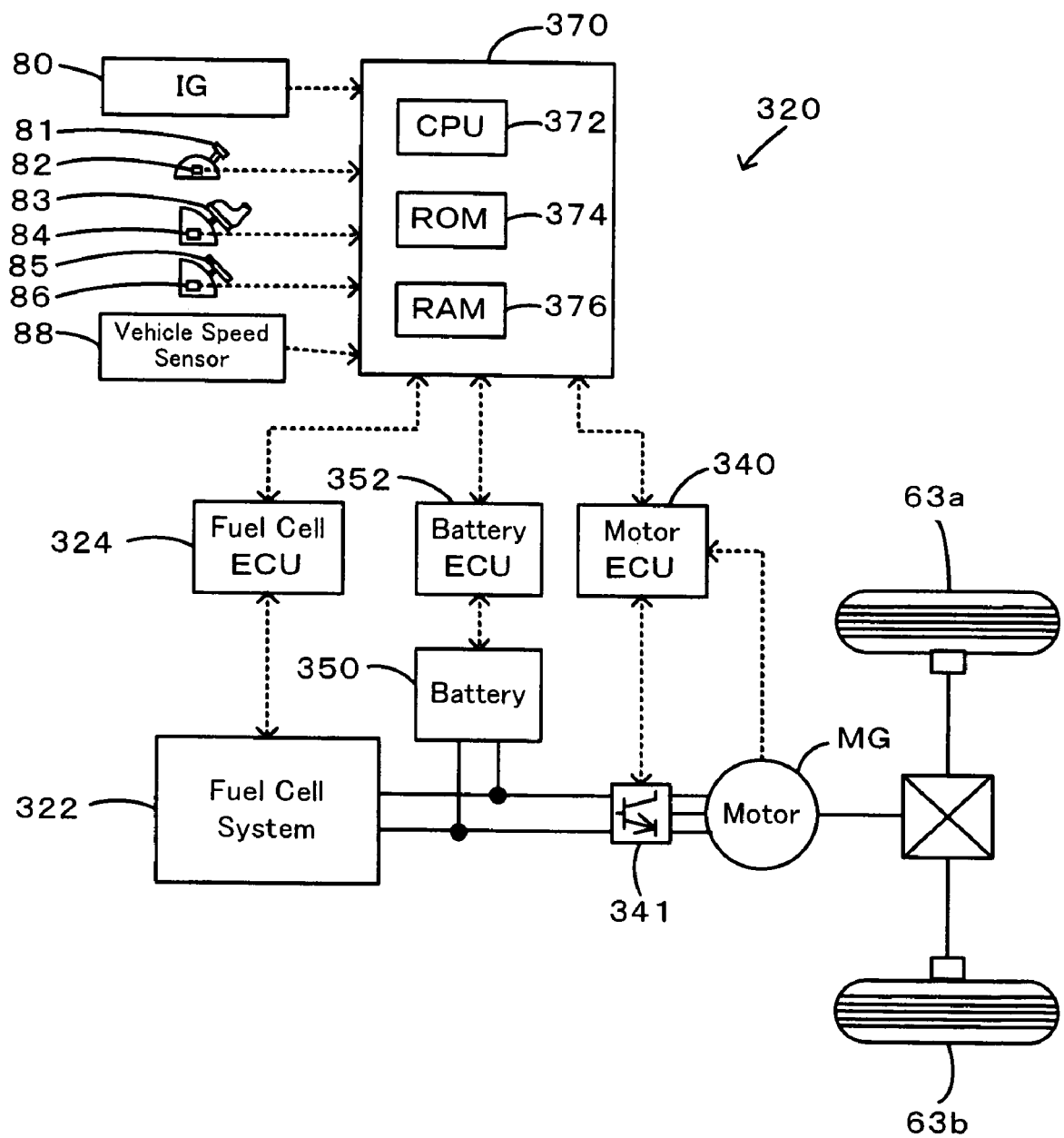
FIG. 11 schematically illustrates the configuration of a fuel-cell vehicle as another modified example.

The embodiment regards the hybrid vehicle 20 equipped with the engine 22, the two motors MG1 and MG2, the battery 50, the hybrid electronic control unit 70, the engine ECU 24, the motor ECU 40, and the battery ECU 52. The technique of the invention is, however, not restricted to these hybrid vehicles but is also applicable to a fuel-cell vehicle 320 equipped with a power output apparatus as shown in FIG. 11. The power output apparatus of this modified example has a fuel cell system 322 including a stack of polymer electrolyte fuel cells (not shown), a motor MG that consumes electric power generated by the fuel cell system 322 to output a driving power, and a battery 350 that transmits electric power to and from the fuel cell system 322 and the motor MG. As the control system, this power output apparatus includes a drive electronic control unit 370 that is equivalent to the hybrid electronic control unit 70 of the embodiment and sets and sends an operation command of the fuel cell system 322 and a torque command of the motor MG, a fuel cell electronic control unit (fuel cell ECU) 324 that receives the operation command of the fuel cell system 322 and controls the operation of the fuel cell system 322, a motor electronic control unit (motor ECU) 340 that receives the torque command of the motor MG and drives and controls the motor MG, and a battery electronic control unit (battery ECU) 352 that manages and controls the operation of the battery 350. As in the hybrid vehicle 20 of the embodiment, there may be a communication lag between the drive electronic control unit 370 and the motor ECU 340 in this fuel-cell vehicle 320. There may be a difference between the activation frequency of the drive control routine by the drive electronic control unit 370 and the activation frequency of the motor control routine by the motor ECU 340. In such cases, the motor ECU 340 resets the torque command of the motor MG within the range of input and output limits Win and Wout of the battery 350 and drives the motor MG with the reset torque command. This arrangement effectively prevents the battery 350 from being overcharged with excessive electric power or being overdischarged to supply excessive electric power.

The embodiment regards the hybrid vehicle 20 equipped with the power output apparatus as one application of the invention. The application of the present invention is, however, not restricted to the power output apparatus mounted on the hybrid vehicle. The power output apparatus of the invention may be mounted on any of various moving bodies including motor vehicles and diversity of other vehicles, boats and ships, and aircraft or may be built in stationary equipment, such as construction machines.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The technique of the invention is preferably applied to the manufacturing industries of power output apparatuses and motor vehicles and other relevant industries.

The invention claimed is:

1. A power output apparatus that outputs power, said power output apparatus comprising:
   a power generation system that receives a supply of fuel to generate electric power;
   a motor that outputs a driving power;
   an accumulator unit that transmits electric power to and from the power generation system and the motor;
   a power demand setting module that sets a power demand required for driving;
   a main control module that makes operation commands of the power generation system and the motor in a range of an input limit and an output limit of the accumulator unit, in order to satisfy the set power demand;
   a drive control module that transmits information to and from said main control module by communication and controls operations of the power generation system and the motor in the range of the input limit and the output limit of the accumulator unit, in response to the operation commands input from said main control module by communication; and
   an input/output limits setting module that sets the input limit and the output limit of the accumulator unit, based on a state of the accumulator unit,
   wherein said main control module makes the operation commands of the power generation system and the motor by taking into account the input and output limits of the accumulator unit set by said input/output limits setting module, and sends the operation commands and the input and output limits to said drive control module.

2. A power output apparatus in accordance with claim 1, wherein said drive control module inputs operation conditions of the power generation system and the motor, and verifies whether the operations of the power generation system and the motor by the operation commands are in the range of the input limit and the output limit of the accumulator unit, based on the operation conditions and the operation commands,
   when the operations of the power generation system and the motor by the operation commands are out of the range of the input limit and the output limit of the accumulator unit, said drive control module updating the operation commands to make the operations of the power generation system and the motor in the range of the input limit and the output limit and controlling the operations of the power generation system and the motor in response to the updated operation commands.

3. A power output apparatus in accordance with claim 2, wherein when the operations of the power generation system and the motor by the operation commands are beyond the range of the input limit, said drive control module updates the operation command of the power generation system to make the operations of the power generation system and the motor approach to the range of the input limit,
   when the operations of the power generation system and the motor by the operation commands are beyond the range of the output limit, said drive control module updating the operation command of the motor to make the operations of the power generation system and the motor approach to the range of the output limit.

4. A power output apparatus in accordance with claim 3, wherein said drive control module updates the operation command of the motor under condition of no power generation by the motor to make the operations of the power generation system and the motor approach to the range of the output limit.

5. A power output apparatus in accordance with claim 4, wherein when the operations of the power generation system and the motor are still beyond the range of the output limit even after update of the operation command of the motor under condition of no power generation by the motor, said drive control module further updates the operation command of the power generation system to make the operations of the power generation system and the motor approach to the range of the output limit.

6. A power output apparatus in accordance with claim 3, wherein the power generation system includes an internal combustion engine and uses at least part of output power of the internal combustion engine to generate electric power, and when said drive control module updates the operation command of the power generation system to make the operations of the power generation system and the motor approach to the range of the input limit, said main control module controls the operation of the internal combustion engine to decrease the output power of the internal combustion engine.

7. A power output apparatus in accordance with claim 1, wherein the power generation system includes an internal combustion engine and uses at least part of output power of the internal combustion engine to generate electric power.

8. A power output apparatus in accordance with claim 6, wherein said power generation system comprises an electric power-mechanical power input output mechanism that is connected with an output shaft of the internal combustion engine and with a driveshaft and outputs at least part of the output power of the internal combustion engine to the driveshaft through input and output of electric power and mechanical power.

9. A power output apparatus in accordance with claim 8, wherein said electric power-mechanical power input output mechanism comprises:
a three shaft-type power input output module that is linked to three shafts, the output shaft of the internal combustion engine, the driveshaft, and a rotating shaft, and inputs and outputs power from and to a residual one shaft based on powers input from and output to any two shafts among the three shafts; and
a generator that inputs and outputs power from and to the rotating shaft.

10. A power output apparatus in accordance with claim 8, wherein said electric power-mechanical power input output mechanism comprises:
a pair-rotor motor that has a first rotor connected to the output shaft of the internal combustion engine and a second rotor connected to the driveshaft and is driven to rotate through relative rotation of the first rotor to the second rotor.

11. A power output apparatus in accordance with claim 1, wherein the power generation system comprises a fuel cell device including fuel cells.

12. A power output apparatus that outputs power, said power output apparatus comprising:
an internal combustion engine as a power source;
a motor that outputs a driving power;
an accumulator unit that transmits electric power to and from the motor;
a power demand setting module that sets a power demand required for driving;
a main control module that controls operation of the internal combustion engine and makes an operation command of the motor in a range of an input limit and an output limit of the accumulator unit, in order to satisfy the set power demand; and
a drive control module that transmits information to and from said main control module by communication and controls operations of the motor in the range of the input limit and the output limit of the accumulator unit, in response to the operation commands input from said main control module by communication,
wherein said drive control module inputs an operation condition of the motor and verifies whether the operation of the motor by the operation command is in the range of the input limit and the output limit of the accumulator unit, based on the operation condition and the operation command, and
wherein, when the operation of the motor by the operation command is out of the range of the input limit and the output limit of the accumulator unit, said drive control module updates the operation command to make the operation of the motor in the range of the input limit and the output limit.

13. A vehicle equipped with a power output apparatus, said vehicle comprising:
a power generation system that receives a supply of fuel to generate electric power;
a motor that outputs a driving power;
an accumulator unit that transmits electric power to and from the power generation system and the motor;
a power demand setting module that sets a power demand required for driving;
a main control module that makes operation commands of the power generation system and the motor in a range of an input limit and an output limit of the accumulator unit, in order to satisfy the set power demand;
a drive control module that transmits information to and from said main control module by communication and controls operations of the power generation system and the motor in the range of the input limit and the output limit of the accumulator unit, in response to the operation commands input from said main control module by communication; and
an input/output limits setting module that sets the input limit and the output limit of the accumulator unit, based on a state of the accumulator unit,
wherein said main control module makes the operation commands of the power generation system and the motor by taking into account the input and output limits of the accumulator unit set by said input/output limits setting module, and sends the operation commands and the input and output limits to said drive control module.

* * * * *